Sept. 10, 1968
R. C. UTTER
3,400,609
TRANSMISSION
Filed Oct. 23, 1965
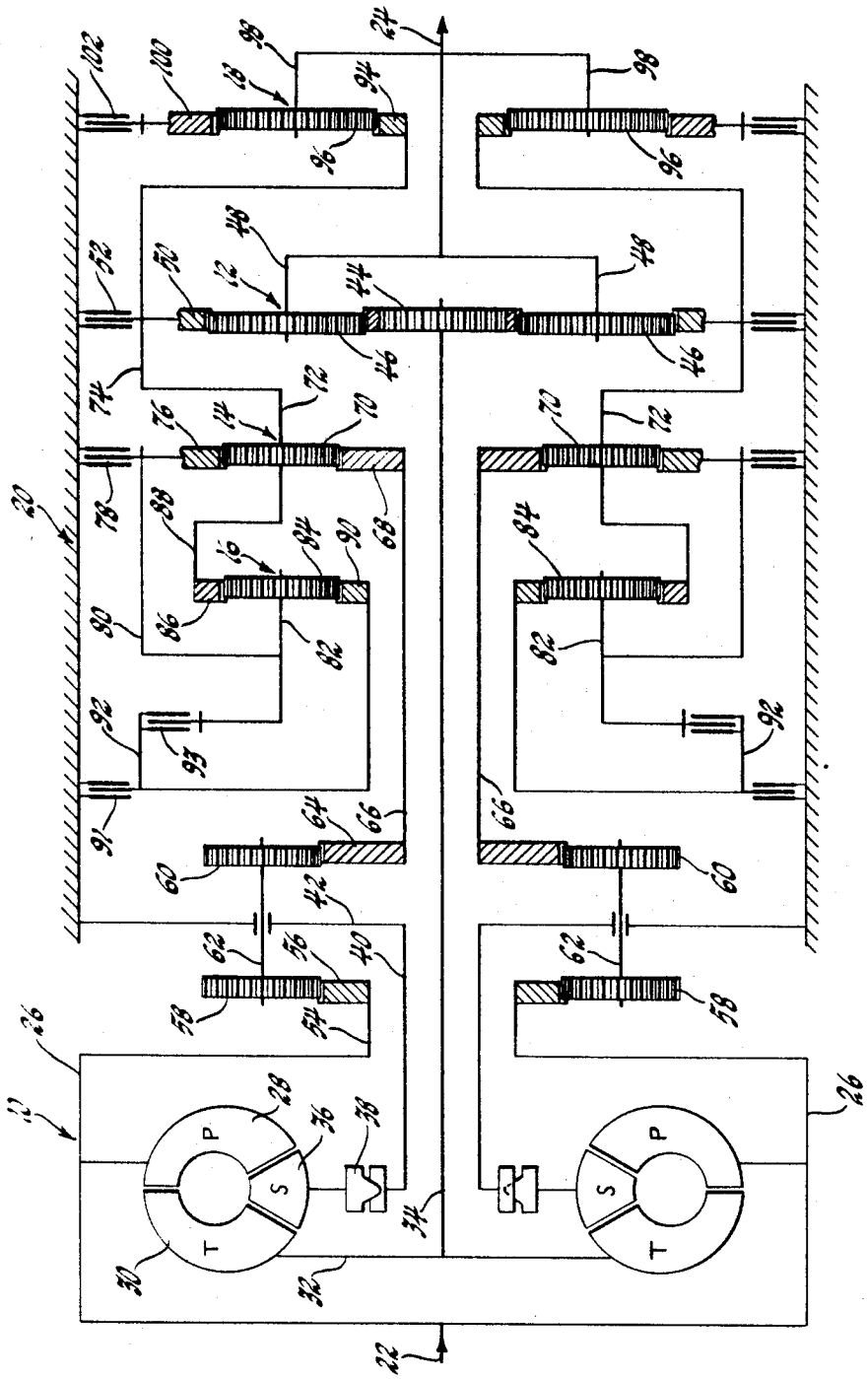
INVENTOR.
Robert C. Utter
BY
A. M. Neiter
ATTORNEY

United States Patent Office 3,400,609
Patented Sept. 10, 1968

3,400,609
TRANSMISSION
Robert C. Utter, Indianapolis, Ind., assignor to General Motors Corporation, Detroit, Mich., a corporation of Delaware
Filed Oct. 23, 1965, Ser. No. 504,020
1 Claim. (Cl. 74—688)

ABSTRACT OF THE DISCLOSURE

A three element torque converter is combined with four forward speed and reverse planetary gearing to provide single power path torque converter drive in a low forward drive range and reverse drive and output split torque drive in three higher forward drive ranges.

---

This invention relates to a transmission and more particularly to a variable speed transmission having a hydrodynamic torque converter and a multiratio gear unit providing hydraulic torque converter drive and split torque drive.

Hydrodynamic torque converters used in vehicle transmissions as torque multipliers have certain advantages, since they can provide infinitely variable speed and torque variations within limited ranges for matching engine power and speed to the load requirements, while at the same time absorbing engine and drive line shocks. When a torque converter is combined with multiratio gearing such as planetary gearing, its limited torque ranges can be extended. Furthermore, when there is provided split torque drive in which there are two parallel paths of power flow, with the torque converter in one path and the other path having all mechanical drive, advantages can be taken from both the torque converter and multiratio gearing to provide a highly efficient transmission of power over a broad torque range, since the mechanical portion of the power transmitted has a high efficiency while the hydraulic portion absorbs engine and drive line shocks while properly matching the engine power and the speed to the load requirements.

This invention is illustrated as employing a three element torque converter married with a four forward speed and reverse planetary gear unit to provide single power path torque converter drive in the lowest forward and reverse drive ranges and an output split torque and dual power path drive in the three higher forward drive ranges in which the drive is partly mechanical and partly through the torque converter with increasing percentage of mechanical torque with each upshift to approach the efficiency of an all mechanical drive while retaining the advantages of a hydraulic drive. The multiratio gear unit employs three planetary gear sets to establish the four forward drive ranges and a reverse planetary gear set to establish the reverse drive range.

The first and lowest forward drive range is established by braking the ring gear of one of the forward drive gear sets which has its sun gear driven by the converter turbine so that the carrier of this first gear set which is connected to the transmission output is driven in the forward direction through the converter and at a reduced speed. The next highest or second forward drive range is established by releasing the first forward drive brake and engaging a second forward drive brake to hold the ring gear of one of the remaining forward gear sets, which has its sun gear driven mechanically by the transmission input to bypass the converter. The carrier of this second gear set is then driven in the forward direction at a reduced speed and drives the connected ring gear of the first gear set, which combines the hydraulic and mechanical torque delivered by the output split torque arrangement thus provided to drive the transmission output in the forward direction in a higher gear range.

The next highest or third forward drive range is established by releasing the second forward drive brake and then holding the sun gear of the third and remaining forward gear set which has its carrier and ring gear connected to the ring gear and the carrier, respectively, of the second gear set so that the ring gear of the first gear set is again driven mechanically in the forward direction but in a higher speed range for an output split torque drive to the transmission output in which the percentage of mechanical torque is increased while the percentage of hydraulic torque is decreased as compared with the lower second forward drive range. In the fourth and highest forward drive range, the third forward drive brake is released and the third forward gear set and thus all forward gear sets are locked up by a drive establishing clutch to provide a direct mechanical drive between the transmission input and the ring gear of the first gear set so that there is again provided output split torque drive to the transmission output. In this highest drive range there is essentially a 1:1 drive between transmission input and output and the percentage of mechanical torque has again increased, while the hydraulic torque has decreased as compared with the lower third forward drive range.

The reverse drive range is provided by the reverse gear set which has its sun gear driven by the ring gear of the first forward gear set and is established by holding its ring gear by a reverse brake to provide a single path hydraulic drive and speed reduction in reverse.

An object of this invention is to provide a new and improved output split torque transmission.

Another object of this invention is to provide a multidrive range transmission providing single power path converter drive in the lowest drive range and an output split torque drive in the higher drive ranges which have an increased percentage of mechanical drive with each upshift.

Another object of this invention is to provide a hydrodynamic torque converter combined with a multiratio gear unit to provide parallel paths of power flow in which the torque converter is in one path together with the gear unit to provide an all hydraulic torque drive and the one path combining with mechanical torque in the other path for output split torque drive in the remaining higher drive ranges in which the mechanical path has a variable speed ratio drive provided by the gear unit so that the percentage of hydraulic torque decreases and the percentage of mechanical torque increases with each upshift for increased efficiency.

Another object of this invention is to provide a four forward speed and reverse variable output split torque transmission providing an all hydraulic torque and gear reduction drive in the first forward drive range and in the reverse drive range and output split torque drive in the remaining three higher forward drive ranges in which the percentage of hydraulic torque decreases and the percentage of mechanical torque increases on each upshift and with the mechanical path for combined drive in the fourth forward drive range being a locked up direct mechanical drive for substantially direct overall transmission drive.

These and other objects of the invention will be more apparent from the following description of the preferred embodiment of the invention illustrated in the accompanying drawing in which:

A diagrammatic view of a transmission according to the invention is shown.

Referring to the drawing, the transmission comprises a torque converter 10 and a planetary gear unit having three forward planetary gear sets 12, 14 and 16, and a reverse planetary gear set 18. These components are all housed by a transmission housing 20 and are combined to connect a prime mover driven transmission input shaft 22 to a coaxial transmission output shaft 24 for four forward drive ranges and a reverse drive range.

The transmission input shaft 22 drives the torque converter housing 26, which has a pump 28 for circulating fluid in the conventional manner within the torque converter torus chamber to the turbine 30, the latter being connected by hub 32 to drive an intermediate or torque converter output shaft 34, and to stator 36. The stator 36 is mounted by a one way brake 38 on a stationary hub 40 extending from housing web 42, and the one way brake 38 holds stator 36 for reaction and permits forward stator rotation at converter coupling speed as in the conventional manner.

Describing now the marrying of the 3 element torque converter with the planetary gear unit, the torque converter output shaft 34 drives the sun gear 44 of gear set 12, which sun gear meshes with a plurality of planetary pinions 46 rotatably mounted on an output carrier 48 connected to drive output shaft 24. A ring gear 50 meshes with pinion 46 and is held for reaction by being grounded to the transmission housing 20 on engagement of a drive establishing brake 52.

Mechanical drive to the multiratio gear unit is by the input driven torque converter housing 26, which in addition to housing the rotatable torque converter elements, is connected by a hub 54 to drive an external tooth annular gear 56 rotatable about hub 40, which gear meshes at diametrically opposite sides with smaller spur gears 58. Gears 58 and identical gears 60 are connected to transfer shafts 62, extending through and rotatably supported by housing web 42. Gears 60 mesh with diametrically opposite sides of an external tooth annular gear 64, connected to drive a sleeve shaft 66 rotatable about shaft 34. The combination of meshing gears 56–58 and 60–64 provides a 1:1 gear train speed ratio to drive sleeve shaft 66 at the input speed of shaft 22. Sleeve shaft 66 has its other end connected to drive the annular sun gear 68 of gear set 14, which sun gear meshes with a plurality of planetary pinions 70 rotatably mounted on a carrier 72, which is connected by a drum 74 to drive ring gear 50 of gear set 12. Pinions 70 mesh with a ring gear 76, which may be held for reaction by a drive estabilshing brake 78 and is also connected by a drum 80 to drive carrier 82 of gear set 16. A plurality of planetary pinions 84 rotatably mounted on carrier 82 mesh with a ring gear 86, which is connected by a drum 88 to carrier 72 of gear set 14 and also mesh with an annular sun gear 90. A drive establishing brake 91, when engaged, holds a drum 92 connected to sun gear 90. A drive establishing clutch 93, when engaged, connects carrier 82 and drum 92 and connected sun gear 90.

The reverse gear set 18 has its sun gear 94 connected by the drum 74 to ring gear 50 of gear set 12 and meshing with a plurality of planetary pinions 96 rotatably mounted on an output carrier 98 connected to drive output shaft 24. Pinions 96 mesh with ring gear 100, which is held for reaction when a drive establishing brake 102 is engaged.

The drive establishing brakes and clutch are of conventional structure and may be actuated in any known way, e.g., electrically, hydraulically, pneumatically, or by some mechanical provision and in a certain sequence.

The transmission described above provides four forward drive ranges and a reverse drive range. The first forward drive range and the one considered the lowest produces the greatest torque multiplication available and is 100% hydraulic drive and occurs when only the drive establishing brake 52 is engaged to hold ring gear 50 for reaction. Then with the converter output shaft 34 driving forwardly, the output carrier 48 and connected output shaft 24 are driven forwardly at a reduced speed with gear set 12 thus acting as a simple torque multiplier.

In the three remaining forward drive ranges there is a pair of parallel power paths to gear set 12 which then acts both as a torque combiner and torque multiplier, so that the advantage of high efficiency mechanical drive is available as well as hydraulic drive for absorbing engine and drive line shocks and for properly matching engine power and speed to the load requirements. The hydraulic path is through the torque converter to the sun gear 44 of gear set 12 and the mechanical path bypasses the torque converter and is through the remaining forward gear sets 14 and 16 singularly and in combination to the ring gear 50 of gear set 12, which then acts as a torque combiner and torque multiplier. This drive arrangement provides what is commonly referred to as an output split in which the ratio between turbine torque and output torque is constant.

To establish the second forward drive range, the previously engaged first forward drive brake 52 is released and the drive establishing brake 78 is engaged to hold the ring gear 76 of gear set 14 for reaction. The geared power train provided by meshing gears 56–58 and 60–64 drives sun gear 68 of gear set 14 at input speed and this causes carrier 72 and connected ring gear 50 of gear set 12 to revolve in the forward direction and at a reduced speed with respect to input shaft 22, while at the same time sun gear 44 of gear set 12 rotates in the forward direction at turbine speed, which turbine speed will approach input speed at converter coupling. The drives to the sun gear 44 and ring gear 50 combine in gear set 12 to cause the pinions 46 to drive the output carrier 48 and connected output shaft 24 in the forward direction with a higher speed ratio proportional to the increased speed ratio drive to ring gear 50. This combined drive thus provides the second forward drive range, which drive or speed range is higher than the first forward drive range.

The third forward drive range is established by releasing the second forward drive brake and engaging the drive brake 91 to hold sun gear 90 of gear set 16. The transmission input shaft 22 with its 1:1 mechanical drive to shaft 66 is geared by the ring gear 76 of gear set 14 to drive carrier 82 of gear set 16 in the forward direction. Since the sun gear 90 of gear set 16 is held stationary, the pinions 84 orbit about sun gear 90 in the forward direction and thus drive ring gear 86 and connected carrier 72 of gear set 14 and ring gear 50 of gear set 12 forwardly and at a reduced speed relative to shaft 66, but in a speed range higher than that obtained in the second forward drive range. The differential speed between sun gear 44 and ring gear 50 is thus smaller than that provided in the second forward drive ratio and causes the pinions 46 to revolve in the forward direction to drive the output carrier 48 and connected output shaft 24 in the forward direction. The third forward drive range is thus higher than the second forward drive range and has a greater percentage of the available torque going by the mechanical path to the ring gear 50 and a corresponding lesser percentage of the available torque going by the hyraulic path to the sun gear 44 than was provided in the second forward drive range.

The fourth forward drive range is provided by engaging only clutch 93 to prevent relative rotation between the sun gear 90 and carrier 82 of gear set 16. Thus gear set 16 and gear set 14 are both locked up and there is provided a 1:1 mechanical drive between input shaft 22 and ring gear 50 of gear set 12. Sun gear 44 continues to be driven at converter turbine speed, which at coupling speed approaches pump and therefore input speed, so that at coupling speed there is provided a substantially 1:1 drive ratio in the fourth forward drive range between input shaft 22 and output shaft 24. Again there is an increased percentage of mechanical torque in the output split torque drive on the upshift, since there will be a greater percentage of mechanical torque to ring gear 50 and a corresponding lesser percentage of hydraulic torque to sun gear 44.

The reverse drive range is established by engaging only drive brake 102 to hold ring gear 100 of gear set 18 stationary. The converter driven sun gear 44 of gear set 12 transmits torque into the ring gear 50 through pinions 46. The torque thus introduced into the drum 74 by ring gear 50 causes sun gear 94 to rotate in the reverse direction and since the ring gear 100 is held stationary, pinions 96 orbit in their ring gear in a direction opposite that of rotation of converter output shaft 34 to drive carrier 98 and connected output shaft 24 in the reverse direction and with a 100% hydraulic torque drive.

As has been shown, in the lowest forward drive range and in the reverse drive range there is provided a 100% hydraulic torque drive and in the remaining three higher forward drive ranges there is provided an output split torque drive in which the drive is partly mechanical and partly hydraulic torque with increasing percentage of mechanical torque with each upshift. Thus, the split torque drive approaches the efficiency of a conventional locked up torque converter drive without using a converter lock up clutch and control, recognizing that on each upshift after the lowest forward drive range the hydraulic torque progressively decreases, while the mechanical torque increases at the same rate.

The above-described preferred embodiment is illustrative of the invention which it will be appreciated may be modified within the scope of the appended claim.

I claim:
1. In a transmission the combination of:
   (a) an input shaft, an output shaft,
   (b) a hydrodynamic torque converter having a pump connected to be driven by said input shaft, a turbine and a stator,
   (c) a first planetary gear set having a sun gear and ring gear and a carrier having pinions meshing with said sun and ring gears, a turbine shaft connecting said turbine to said sun gear, a brake for holding said ring gear and said carrier connected to drive said output shaft whereby engagement of said brake establishes a first forward drive range,
   (d) a second planetary gear set having a sun gear, a ring gear and a carrier having pinions meshing with said sun and ring gears, a gear train including a sleeve shaft surrounding said turbine shaft and a transfer shaft offset from and parallel to said turbine shaft operatively drivingly connecting said input shaft to said sun gear and providing a 1:1 drive ratio, a brake for holding said ring gear and said carrier connected to drive the ring gear of said first gear set whereby engagement to said brake establishes a second forward drive range,
   (e) a third planetary gear set concentrically located about said sleeve shaft intermediate said converter and second gear set and having a sun gear, a ring gear and a carrier having pinions meshing with said sun and ring gears, said carrier connected to be driven by the ring gear of said second gear set, a brake for holding said sun gear and said ring gear connected to drive the carrier of said second gear set whereby engagement of said brake establishes a third forward drive range,
   (f) a clutch concentrically located about said sleeve shaft intermediate said converter and said third gear set for directly connecting the sun gear and the carrier of said third gear set to provide a 1:1 drive ratio between said input shaft and the ring gear of said first gear set whereby engagement of such clutch establishes a fourth forward drive range,
   (g) and a fourth planetary gear set having a sun gear, a ring gear and a carrier having pinions meshing with said sun and ring gears, said sun gear connected to be driven by the ring gear of said first gear set, a brake for holding said ring gear and said carrier connected to drive said output shaft whereby engagement of said brake establishes a reverse drive range.

References Cited
UNITED STATES PATENTS

| | | | |
|---|---|---|---|
| 1,404,675 | 1/1922 | Wilson | 74—761 |
| 2,127,655 | 8/1938 | Stromquist et al. | 74—761 |
| 2,519,022 | 8/1950 | Burtnett | 74—688 |
| 2,572,007 | 10/1951 | Burtnett | 74—688 X |
| 3,107,553 | 10/1963 | Tuck | 74—688 |
| 3,205,730 | 9/1965 | Hause | 74—688 |
| 3,296,891 | 1/1967 | Tuck | 74—688 X |
| 3,299,743 | 1/1967 | Stockton | 74—688 X |

FRED C. MATTERN, Jr., *Primary Examiner.*

THOMAS C. PERRY, *Assistant Examiner.*